United States Patent [19]

Smyly, Sr.

[11] Patent Number: 5,005,852
[45] Date of Patent: Apr. 9, 1991

[54] SEPARATIVE TRAILER TONGUE HITCHING METHOD

[76] Inventor: George M. Smyly, Sr., 1903-B Carlton St., N. Charleston, S.C. 29405

[21] Appl. No.: 397,246

[22] Filed: Aug. 23, 1989

[51] Int. Cl.$^5$ .............................................. B60D 1/00
[52] U.S. Cl. ...................................................... 280/477
[58] Field of Search .................. 280/477, 478.1, 479.1, 280/479.2, 479.3, 480, 480.1, 482, 483, 486

[56] References Cited

U.S. PATENT DOCUMENTS

| | | | |
|---|---|---|---|
| 2,366,294 | 1/1945 | Stringer | 280/482 |
| 2,753,192 | 7/1956 | Davis et al. | 280/477 |
| 3,761,113 | 9/1973 | Smitherman | 280/479.3 |
| 3,938,122 | 2/1976 | Mangus | 280/477 |
| 4,125,272 | 11/1978 | Putnam et al. | 280/479.3 |
| 4,186,939 | 2/1980 | Woods et al. | 280/477 |
| 4,466,632 | 8/1984 | DeVorak | 280/479.3 |
| 4,773,667 | 9/1988 | Elkins | 280/479.3 |
| 4,793,626 | 12/1988 | Gefroh | 280/478.1 |
| 4,807,899 | 2/1989 | Belcher | 280/479.2 |

FOREIGN PATENT DOCUMENTS

0136017 4/1985 European Pat. Off. ......... 280/479.3

Primary Examiner—Charles A. Marmor
Assistant Examiner—Alan M. Kagen

[57] ABSTRACT

A separative trailer tongue having first and second assemblies united by a winching apparatus. The first assembly is a housing integral with a handle and a coupler. A bracket, spring return brace, rod stop and pulleys are within the housing. The brace supports the first assembly such that the second assembly can be pulled, lifted, aligned and united therewith. The second assembly has bifurcated bars sandwiching blocks. The blocks have longitudinally aligned apertures having a pull, lift, align rod slidingly disposed through the apertures. One end of a winch cable is attached at a tapered forward end of the rod. The cable now extends to and trains about the first assembly pulleys, the cable returning through an aperture at the tapered forward end of the rod, continuing to extend to a winching apparatus. Winching the cable pulls, lifts, and aligns this second assembly rod until the tapered forward most end thereof abuts the first assembly stop, at which time continued winching results in the bifurcated bars being received into the housing as the rod is forced rearward.

19 Claims, 5 Drawing Sheets

SEPARATIVE TRAILER TONGUE HITCHING METHOD

BACKGROUND OF THE INVENTION

1. Field of the Invention

The present invention relates to hitching a trailer to a vehicle. More specifically, the present invention relates to a physically easy and non-frustrating method of hitching a trailer to a vehicle, especially when the vehicle and trailer tongue are not aligned.

2. Prior Art

Hitching a trailer to a vehicle can be difficult to impossible for many people, especially the handicapped, or elderly. Several hundred pounds of tongue weight is not uncommon, and this tongue weight, though necessary, is detrimental to the desire to own or use trailers, especially among boaters, campers, travelers, and business personnel.

A number of trailer hitching related patents have been issued - proving the need for a reasonable solution to a long standing problem.

Putnam, Jr. and Malone, U.S. Pat. No. 4,125,272; Elkins, U.S. Pat. No. 4,773,667; Woods and Peski, U.S. Pat. No. 4,186,939; Mangus, U.S. Pat. No. 3,938,122, and DeVorak, U.S. Pat. No. 4,466,632, Belcher, U.S. Pat. No. 4,807,899 are examples of commendable solutions for trailer hitching problems. However, this new separative trailer tongue hitching method device, which will pull, lift, align and couple a trailer tongue to the hauling vehicle, will prove to be a more reasonable solution to trailer hitching problems.

It will be nice to have an easy to manage trailer — perhaps a larger trailer.

Also, it will prove difficult to design a comparable device at a lower cost than the hereinafter presented.

SUMMARY OF THE INVENTION

The principal object of the present invention is to provide a device that is safe and will ease the burden of hitching a trailer to a vehicle.

It is also an object of the present invention to eliminate having to park a vehicle such that the vehicle is aligned with a trailer hitch.

Another object of the present invention is to provide a device that can be installed on most trailers.

A further object of the present invention is to provide a device that is unique and will make ownership of a trailer pleasurable.

Yet another object of the present invention is the use of a miniature powerful winch, the use of such a winch being possible because of the relative short length of cable required by this device.

Yet an even further object of the present invention is to provide a device that drags a trailer into the coupled, ready to be towed by a transporting vehicle, position.

The foregoing objects can be accomplished by providing a separative trailer tongue. In the preferred embodiment of the invention a first assembly comprising a housing, integral with a coupler and handle, is coupled to a vehicle. The now coupled assembly is several feet removed from the second assembly of the separative tongue. The first assembly coupled at the vehicle is supported at a near horizontal position by means of a ball fastening, nut like, lug and brace arrangement. The brace, a component of the first assembly housing, is maintained in a locked position such that the forward concave end thereof is abutting the lug. Cabling is extended from pulleys within the first assembly to the second assembly. The end of the extended cable is attached through a hole at the forward tapered end of a slide rod. The standing portion of the cable now enters an adjacent slide rod hole, passes through a longitudinal channel of the slide rod and to a winch via a pulley. Second assembly bifurcated bars sandwich and are integral with two longitudinally spaced-apart blocks. The blocks have longitudinally aligned apertures wherein the mentioned slide rod is slidingly captured. Winching of the cable pulls the slide rod into alignment and contact with a first assembly rod stop. Continued winching forces the bifurcated bars to enter the first assembly housing. The slide rod is being forced rearward as the bars enter the housing. The bars, entering the housing, fork all housing internal components, and via contact with a lever, disengage the mentioned brace from the lug. Upon inserting a safety pin, the trailer is ready to be transported.

BRIEF DESCRIPTION OF THE DRAWINGS

This invention, the preferred mode of use and further objects and advantages thereof, will be best understood by referring to the following detailed description when read in conjunction with the accompanying drawings, wherein.

DESCRIPTION OF THE PREFERRED EMBODIMENT OF THE INVENTION

Referring to the various figures of the drawings, wherein like reference characters refer to like parts, FIGS. 1-4 generally show the separative trailer tongue hitching method during various stages of a trailer hitching operation. As best shown in FIGS. 1-3, 9-10, 15 and 17, the separative trailer tongue hitching method device comprises two assemblies and a special elongated cylindrical lug 38 providing inner threaded nut like means for fastening a conventional hitching ball to a towing vehicle ball mount, FIGS. 15 and 17. The first assembly has an elongated square tubular housing 6 integral with a conventional coupler 39, with other components of the assembly to be hereinafter described. The second assembly has bifurcated parallel laterally spaced-apart bars 8,9, with other components thereof also to be hereinafter described. The bars 8,9 are to be received into the housing 6 for the purpose of uniting the second assembly with the first.

Figure 15:
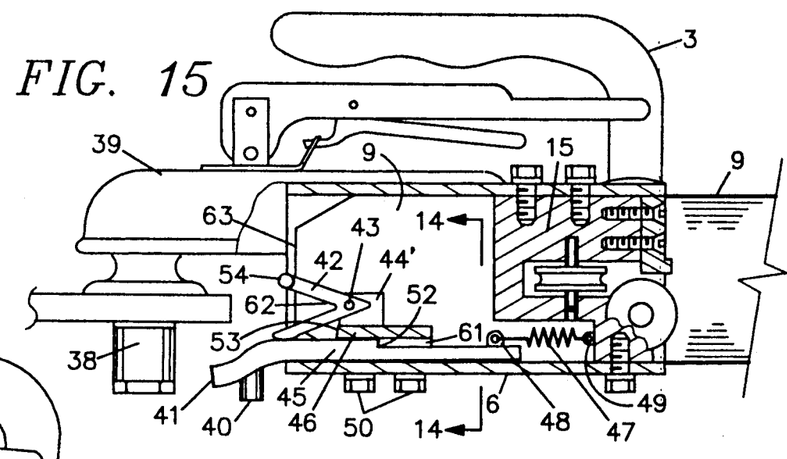
FIG. 15 depicts a cut-away sectional side view of the first assembly of the present invention.
Figure 17:
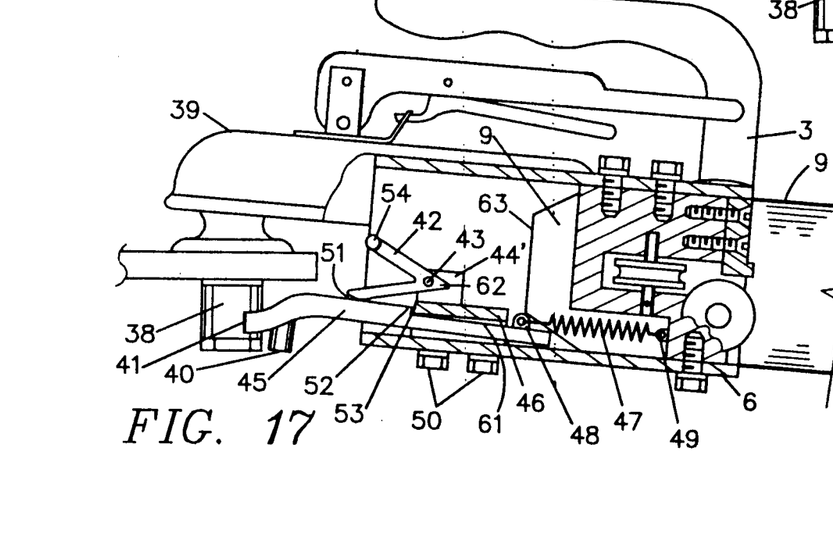
FIG. 17 is a view similar to FIG. 15 showing the first assembly in the coupled and braced position.

Viewing FIGS. 15 and 17, the first assembly comprises the mentioned coupler 39 and housing 6, and also a handy handle 3, a bracket 46, a spring 47 retracted sliding brace 45, a V-shaped pivotal contact lever 62, and a pulley support frame 15.

Referring to FIGS. 5-11, 15 and 17, the frame 15 is laterally centered within and at the rear most end of the housing 6 being fastened therewithin with machine bolts 25, 26, 26' which enter drill holes through the housing 6 and screw into inner threaded receiving holes located at the upper and lower surfaces of the frame 15. The frame 15 supports a rotatingly secured horizontal pulley 14 and two rotatingly secured rearward directed vertical pulleys 12,13, plus the stop 17.

Figure 7:
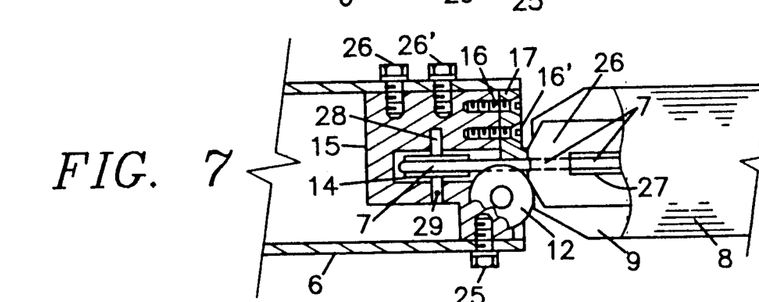
FIG. 7 depicts a sectional cut-away side view showing aligned components of the present invention.
Figure 8:
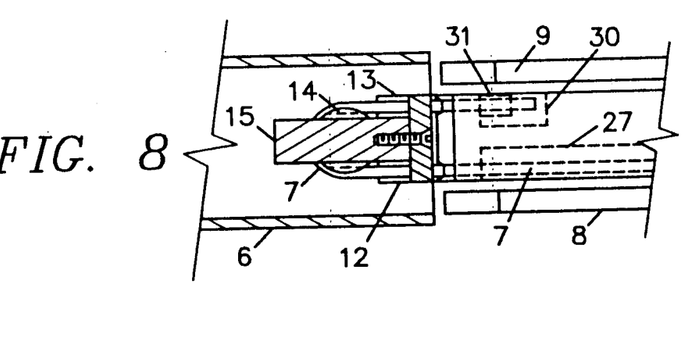
FIG. 8 is a top view of FIG. 7 and shows more details of the alignment of the components of the present invention.

Viewing FIG. 7, the horizontal pulley shaft 28 is secured within the frame 15 by the drift pin 29 which is forcefully inserted into aligned apertures which pass through the frame 15 and the near lower end of the shaft 28. The horizontal pulley 14 is now laterally and vertically centered at a somewhat rearward location within the housing 6.

Figure 10:
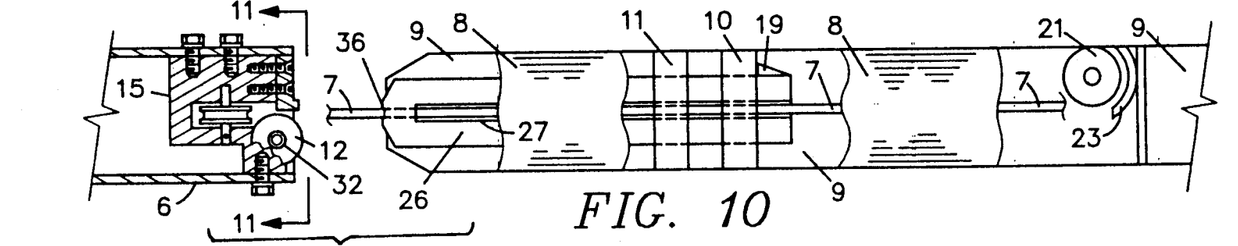
FIG. 10 depicts a sectional cut-away side view of the separative trailer tongue components in a separated state.
Figure 11:
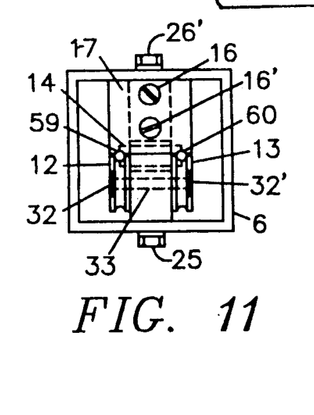
FIG. 11 is a view of the first assembly taken on the line 11—11 of FIG. 10.

Viewing FIGS. 10 and 11, the two vertical pulleys 12,13 sandwich a somewhat rearward portion of the pulley support frame 15, share a common shaft 33 which passes through a lateral drill hole through the sandwiched portion of the frame 15, and are secured upon the extended portions of the common shaft 33 by Truarc snap rings 32,32' which are attached where the ends of the shaft 33 slightly protrude at the open faced sides of the pulleys 12,13. The pulleys 12,13 are aligned such that a cable trained about the horizontal pulley 14 will also train upon the vertical pulleys 12,13. The grooved rims of the pulleys 12,13 slightly protrude from within the open rear end of the housing 6.

Figure 14:
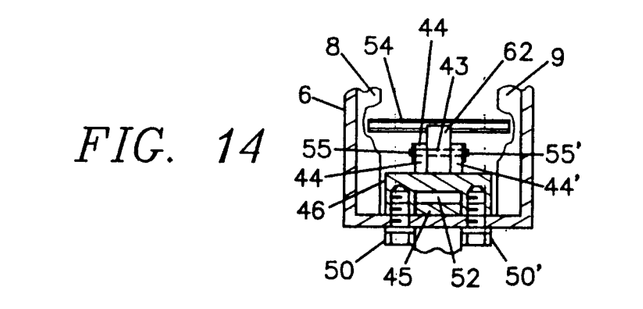
FIG. 14 is a fragmentary sectional view taken on the line 15—15 of FIG. 15.

The stop 17 is fastened upon the upper rear surface of the frame 15 using countersunk, slotted, flat head stove bolts 16,16' which enter tapered drill holes through the stop 17 and screw into inner threaded receiving holes located at the upper rear surface of the frame 15. The semicircle cable guide notches 59,60 located at the bottom edge of the stop 17 will maintain the lay of a cable within the upper grooved ridges of the vertical pulleys 12,13. Viewing FIGS. 14,15,17, the bracket 46 is laterally centered and fastened at the forward most inner lower surface of the housing 6 with machine bolts 50,50' which enter drill holes through the housing 6 and screw into inner threaded receiving holes located at the underside of the bracket 46. The brace 45 is slidingly captured within a longitudinal lower channel 61 of the bracket 46 and upon the inner lower surface of the housing 6. The brace 45 has a slightly angled upper surface catch lip 52 which will lock with the also slightly angled upper forward surface 53 of the bracket 46 lower channel 61. The brace must be pulled against spring 47 tension to accomplish the locking of the brace 45 with the bracket 46, the handy brace stud 40 providing gripping means for pulling upon the brace 45. The brace 45 retracting spring 47 will maintain this locked condition. The spring 47 is attached between tac welded tabs 48,49 attached at the lower forward surface of the frame 15 and the rear upper surface of the brace 45.

The forward most end 41 of the brace 45 has a concave shape for surroundingly engaging and abutting the mentioned lug 38. The brace 45 is bent and shaped to facilitate having the end 41 thereof properly mated with the lug 38.

The V-shaped pivotal contact lever 62 is secured between the vertical supports 44,44' by having the shaft 43 rigidly secured within the support apertures, the shaft 43 being forcefully inserted therewithin resulting in compression type holding means upon the same. The lever 62 has a contact rod 54 welded at the forward end of the upper leg 42 thereof such that the rod 54 is laterally positioned and forming a cross tee with the leg 42. The lower leg has the forward undersurface 51 thereof resting upon the upper surface of the brace 45 Viewing FIGS. 1,2,3 and 17, coupling the first assembly to a vehicle and having the concave end 41 of the locked brace 45 surroundingly abutting the lug 38 will maintain the assembly in a near horizontal position sloping slightly downward from the vehicle 1. In this position the assembly is pivotal in the near horizontal plane and will support enormous downward directed forces. The hitching ball, ball mount and lug 38 will withstand the torque forces hereinafter better understood.

Viewing FIGS. 5-10, the second assembly comprises the mentioned bifurcated parallel laterally spaced-apart bars 8,9 and, also, the pull/lift/align slide rod 26, the blocks 10,11, the cable 7, the pulley 21 and winching means.

The bars 8,9, having beveled forward most ends 63,63', sandwich and are integral with two longitudinally spaced-apart symmetrical, welded in place blocks 11,10. The blocks 11,10 have rectangular apertures such that the elongated somewhat rectangular shaped pull-/lift/align slide rod 26 is slidingly disposed through the apertures. The forward most end of the slide rod 26 is somewhat tapered. The angular shaped protruding stop 19 welded upon the upper rear most end surface of the rod 26 limits the forward motion of the rod 26 as the protruding stop abuts the rear surface of the rear most block such that when the rod 26 is extended to the maximum forward position the forward most tapered end of the rod will slightly protrude beyond the forward most beveled ends 63,63' of the bars 8,9.

Figure 5:
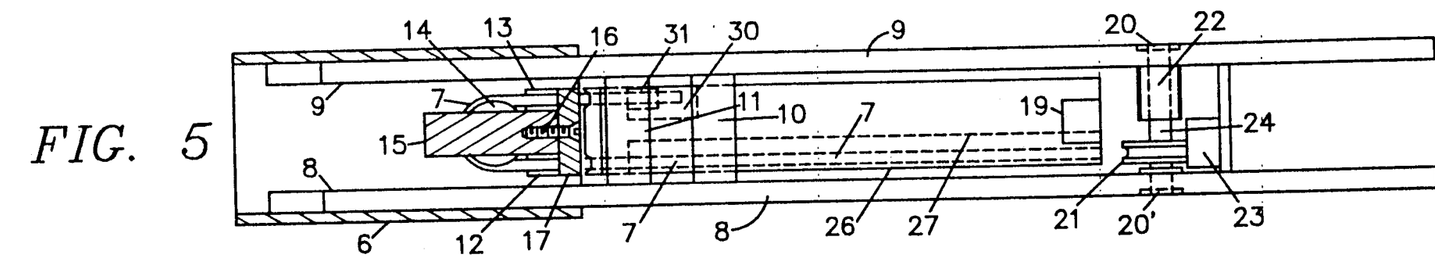
FIG. 5 depicts a top view of FIG. 6.
Figure 9:
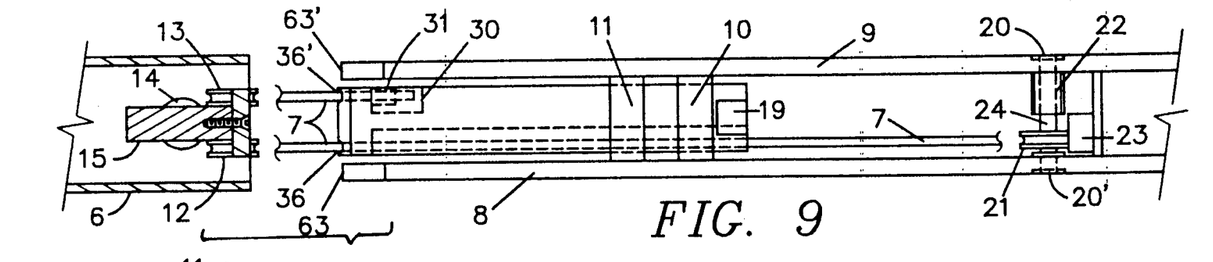
FIG. 9 is a top view of FIG. 10.

The end of a flexible cable 7 enters the forward most tapered end of the rod 26 via a longitudinal drill hole and terminates within a holding channel 30 milled into the far side of the rod 26. As best shown in FIGS. 5 and 9 a compression fitting 31 lugged onto the end of the cable secures the cable within the channel. The end of the cable is now attached at the forward most tapered end of the rod 26. The cable 7 now extends to the first assembly housing 6 and, being necessarily mentioned again, trains about the horizontal pulley 14 and upon the vertical pulleys 12,13. The flexible cable 7 standing end returns through an aperture, the aperture being another longitudinal drill hole at the forward most tapered end of the rod 26 and extends through another milled channel 27 along the near side of the slide rod 26. This second channel 27 extends to the rear most end of the slide rod 26. The cable 7 now extends from the channel 27 to hereinafter described winching means. It is important to notice that the drill holes 36,36' are laterally spaced apart and taken together appear centered when looking into the fore end of the second assembly. It is important to notice that the drill holes 36,36' are inwardly beveled to prevent fraying of the cable 7.

Figure 13:
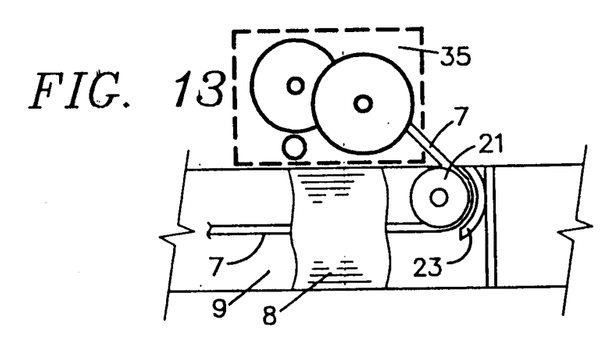
FIG. 13 depicts a cut-away side view of a winch secured at the top surface of a separative trailer tongue.

Viewing FIG. 13, a winch 35 secured external of the space between the bars, or upon the upper surface of the separative trailer tongue, will have the cable 7 trained about the cable guide pulley 21.

Figure 6:
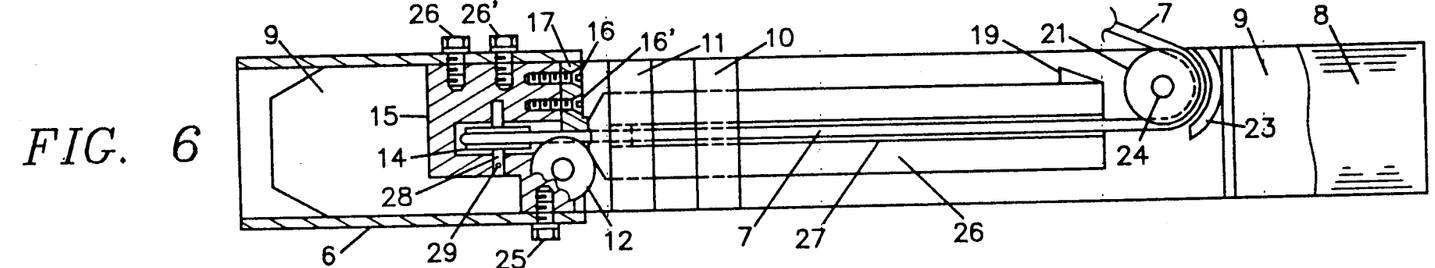
FIG. 6 depicts a sectional cut-away side view of components of the separative trailer tongue as the components are partially united.

Viewing FIGS. 5 and 6, the cable guide pulley 21 is located such that there is space for the rod 26 to retract, the cable guide pulley 21 also serving as a rod 26 stop. The cable guide 23 prevents the cable 7 from inadvertently disengaging from the cable guide pulley 21. The pulley shaft 24 is secured using Truarc snap rings 20,20' which are installed near the ends of the shaft 24 and at the outboard sides of the bars 8,9. The spacer 22 permits a degree of lateral motion of the cable guide pulley 21 upon the shaft 24 to facilitate alignment of the cable 7 with a tongue upper surface mounted winch 35 (FIG. 13).

Figure 12:
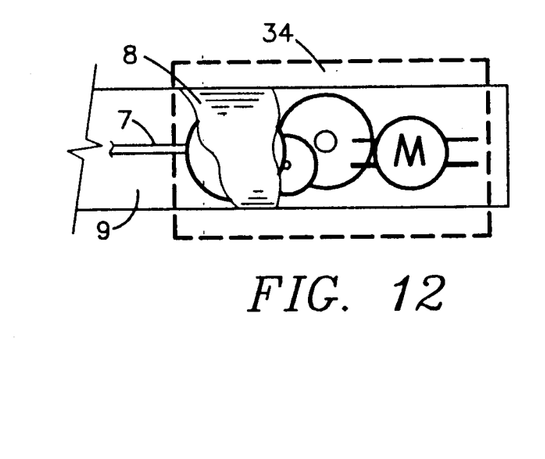
FIG. 12 depicts a cut-away side view of a miniature winch within the trailer tongue of the separative trailer tongue.

Viewing FIG. 12, a miniature winch 34 is depicted as being secured within the trailer tongue and between the bars 8,9, the bars extending rearward beyond the rear most block 10 (FIGS. 5 and 6). The use of a miniature winch is possible because of the short length of cable 7 required for this device A person skilled in the art would be able to accomplish this innovation.

Figure 1:
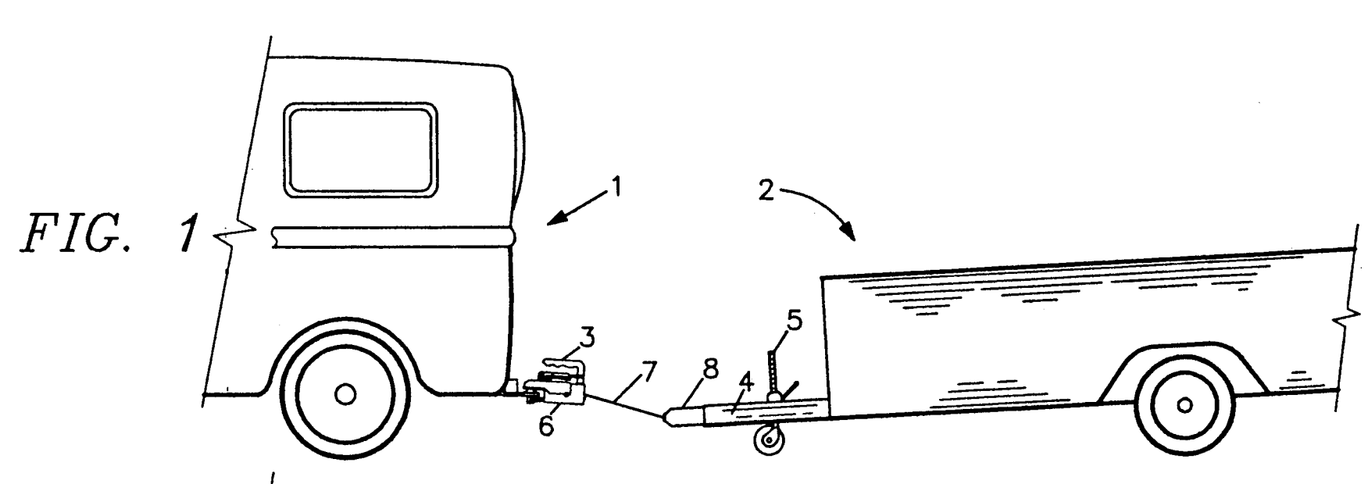
FIG. 1 depicts a side view of the separative trailer tongue wherein the first assembly is coupled to a towing vehicle and the second assembly, being combined with a trailer tongue and trailer, is several feet removed therefrom.
Figure 2:
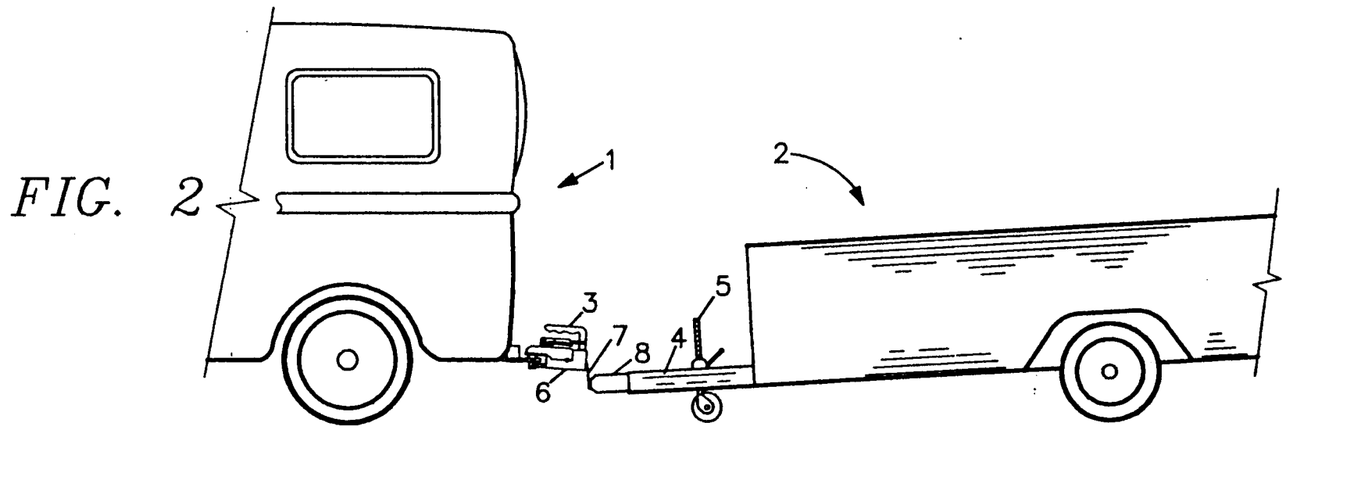
FIG. 2 depicts a view similar to FIG. 1 in which first and second assemblies are somewhat drawn closer via understood winching means.
Figure 3:
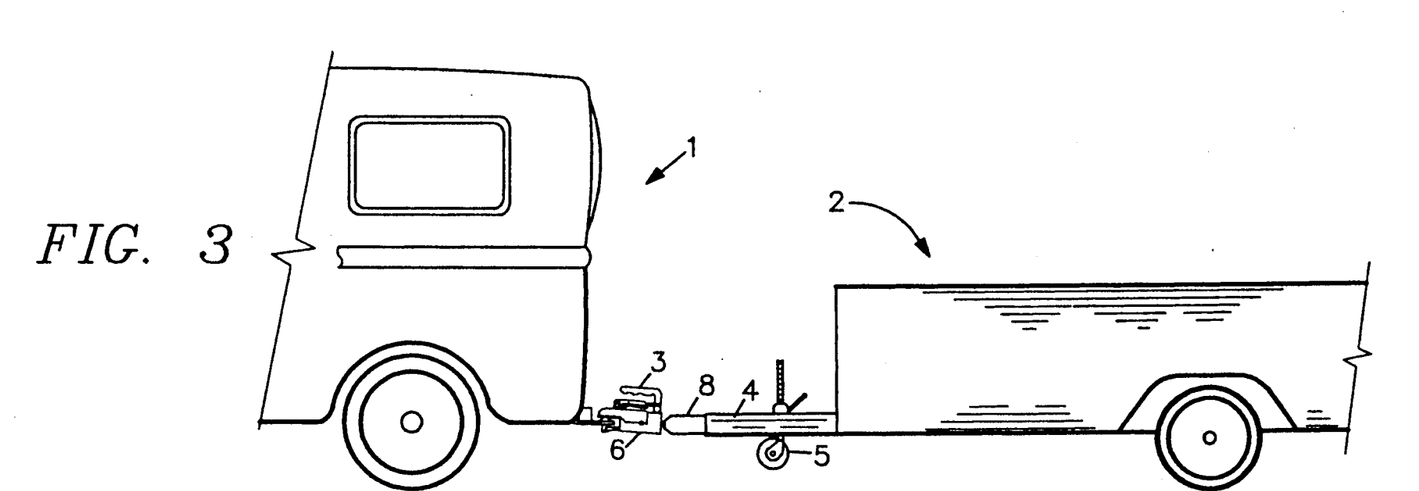
FIG. 3 depicts a view similar to FIGS. 1 and 2 in which the two assemblies have been drawn into contact.
Figure 4:
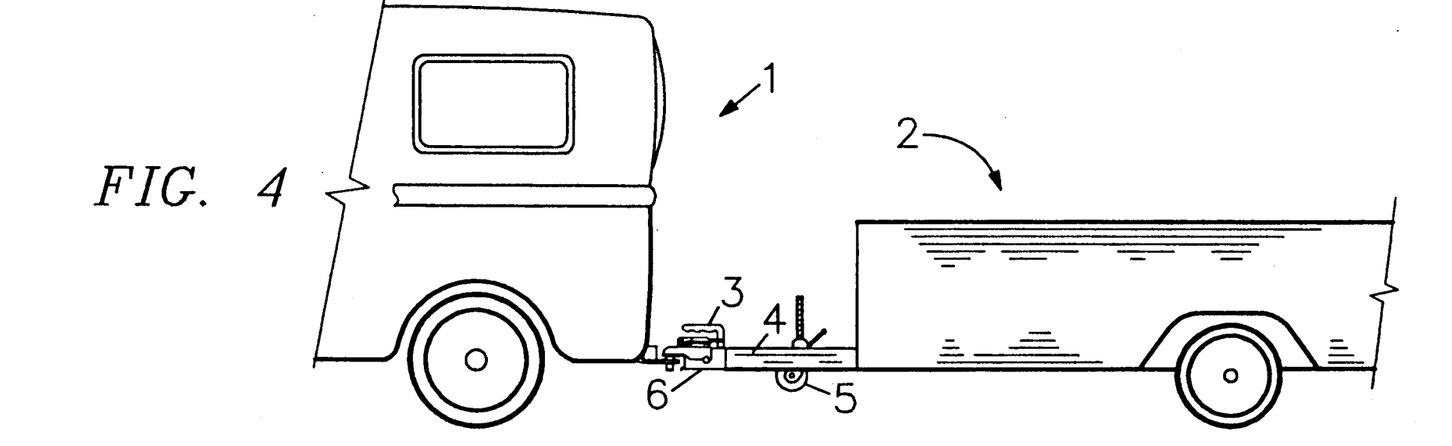
FIG. 4 depicts a view similar to FIGS. 1, 2, and 3 in which the assemblies are united.

Viewing FIG. 1, after backing and parking the towing vehicle 1 such that the hitching ball is somewhat near the pivotal jack wheel 5 supported separative trailer tongue hitching device the first assembly is manually separated from the second assembly and coupled as shown in FIGS. 1 and 17.

Viewing FIGS. 2,3,7 and 8, upon winching, the second assembly slide rod 26 is pulled, lifted and aligned until the forward most tapered end thereof abuts the forward surface of the first assembly stop 17. At this time the rotation of the first assembly pulleys will cease. None the less, as shown in FIGS. 5 and 6, continued winching causes the bifurcated bars 8,9 to be forcefully, wedgingly received within the housing 6, forking internal components thereof, except the contact rod 54 shown in FIGS. 14 and 15. The slide rod 26, overcoming all friction with the blocks 10,11, is forced rearward as the bars 8,9 are received in the housing 6.

Prior to complete registration of the bars 8,9 with the housing 6, the contact rod 54 is pushed by the forward edges 63,63' of the bars 8,9, causing slight pivotation of the V-shaped lever 62, causing the lower leg under surface 51 resting upon the brace 45 to push the brace 45 causing the catch lip 52 to unlock from the bracket 46 lower channel forward surface 53 unlocking the brace 45 which now retracts under spring 47 tension resulting in the brace 45 forward most concave end 41 clearing the lug 38.

Figure 16:
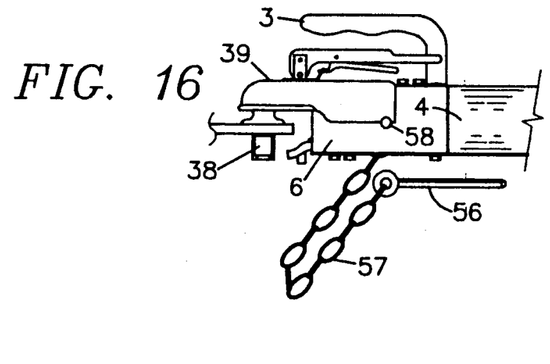
FIG. 16 depicts a side view of safety pin locking means for the present invention.

Viewing FIG. 16, the housing 6 has apertures in it aligned with apertures in the bifurcated bars and a locking pin 56 is removably receivable within the aligned apertures. The locking pin 56 is attached to a link 57 which in turn is secured to the housing 6 to prevent the locking pin from inadvertently becoming separated from the housing 6.

Viewing FIG. 1, the conventional pivotal jack wheel 5 provides low friction conveyor means and tongue 4 height adjustments to facilitate necessary movements of the separative trailer tongue and an attached trailer 2 during hitching operations.

Unhitching the trailer is accomplished by using the jack wheel to lift the trailer tongue separating the coupler component from the vehicle ball component.

It is important to know that the hauling vehicle hitching ball, or the like, does not have to be aligned with this invention prior to hitching operations.

For reasons of clarity within this specification it is necessary to show a conventional trailer tongue and trailer combined with the invention.

A person skilled in the art could fabricate and install other than the shown conventional ball and coupler components, provide an adjustably fastened bracket 45, and shape the brace 45 such that the device could function with other than the shown conventional coupling means.

A person skilled in the art could fabricate and install the necessary components of this invention on existing trailer tongues. For instance, a sleeve could be used to combine the first and second assemblies with a conventional trailer tongue should direct welding, or fastening means, be undesirable.

A winch could be mounted anywhere on the trailer by using pulley and cabling arrangements to suit.

Type winches used with this device can include manual, electrical, remote controlled, or combinations of the mentioned.

"The foregoing description of the preferred embodiment of the invention has been presented for the purpose of illustration and description. It is not intended to be exhaustive or to limit the invention to the precise form disclosed. Many modifications and variations are possible in the light of the above teaching. It is intended that the scope of the invention be limited not by the detailed description, but rather by the claims appended hereto".

I claim:

1. A separative trailer tongue comprising:
   (a) a first assembly housing integral with a handle and a coupler and means for coupling a first end of said coupler to a vehicle;
   (b) a bracket having a brace slidingly captured within a lower channel thereof, said bracket fixedly attached, using fasteners, upon a forward inner lower surface of said housing, said brace having a tab attached upon a rear upper surface thereof, a frame having a tab attached at a lower forward surface thereof, and a brace retracting spring attached between said tabs, a stud fixedly attached at a forward lower surface of said brace, said stud providing means for gripping and pulling said brace, locking a catch lip of said brace with a forward surface of said bracket lower channel, a forward most end of said brace having a concave shape and protrudes from within said housing when said catch lip is locked, said spring maintaining said catch lip in a locked position, said spring retracts said brace when said catch lip is unlocked;
   (c) a horizontal pulley, two rearward directed vertical pulleys and a stop supported by said frame, said frame fixedly attached, using fasteners, within and at rear most end of said housing, said stop secured, using fasteners, upon a rear surface of said frame;

(d) an elongated cylindrical lug, said lug providing nut like means for fastening a hitching ball upon a ball mount, said lug also providing a support for said locked protruding brace forward most end, said forward most concave shaped end surroundingly abutting said lug, said first assembly housing, being coupled to said vehicle and supported in a near horizontal position, said first assembly housing being pivotal in a near horizontal plane;

(e) a V-shaped pivotal lever secured between two supports, said supports attached at a forward top surface of said bracket, an upper leg forward end of said lever having a contact rod fixedly attached thereto, a lower leg of said lever having a forward under surface resting upon an upper surface of said brace;

(f) second assembly bifurcated bars, said bars having beveled forward most ends, said bars registrable with inner surfaces of said first assembly housing when said bars are received in said housing, said bars sandwich and are integral with longitudinally spaced-apart blocks, said bars extending rearward beyond said blocks providing space between said bars to secure a cable guide pulley and a winch, said blocks having longitudinally aligned apertures; and (g) a pull/lift/align slide rod disposed through said apertures, a rear most end of said slide rod having a protruding stop, said protruding stop abuts a rear surface of rear most block, said slide rod having a tapered forward most end, said tapered forward most end slightly protrudes beyond said forward most beveled ends of said bars, said slide rod having an end of a cable attached at said tapered forward most end, said cable extending and trained about said horizontal pulley and upon said vertical pulleys, semicircle cable guide notches at bottom edge of said frame supported stop maintaining said cable within upper grooved rims of said vertical pulleys, grooved rims of said vertical pulleys slightly protrude from within rear end of said housing, said cable returning through aperture in said tapered forward most end of said slide rod, said channel extending from said channel to winching means, said frame secured stop having said slide rod forward most end abutting a forward surface thereof during winching resulting in said slide rod being forced rearward as said bars are being received in said housing, said bars forking internal components of said housing, except said contact rod, forward edges of said bars pushing said contact rod pivoting said lever causing said under surface resting upon said brace to push said brace causing said catch lip to unlock from said bracket lower channel forward surface causing said brace to retract under spring tension resulting in said brace forward most concave shaped end clearing said lug, said first and second assemblies being united.

2. A separative trailer tongue as in claim 1, wherein said first assembly housing has apertures in it aligned with apertures in said second assembly bifurcated bars, and a pin removable receivable within said aligned apertures.

3. A separative trailer tongue as in claim 1, wherein a winch is secured to an external surface of said trailer tongue, having said cable training about said cable guide pulley.

4. A separative trailer tongue as in claim 1, wherein a winch is located external of said space between said bars.

5. A separative trailer tongue as in claim 1, wherein said first and second assemblies of said separative trailer tongue can be combined with a conventional trailer tongue.

6. A separative trailer tongue as in claim 1, wherein a conventional pivotal jack wheel provides low friction conveyor means and height adjustments to facilitate necessary movements of said separative trailer tongue and an attached trailer during phases of a hitching operation.

7. A separative trailer tongue comprising:

(a) a first assembly housing integral with a handle and a coupler and means for coupling a first end of said coupler to a vehicle;

(b) a frame fixedly attached within and at rear most end of said housing, said frame supporting a horizontal pulley, two rearward directed vertical pulleys, and a stop;

(c) a brace slidingly captured within a lower channel of a bracket, said bracket fixedly attached at forward most inner lower surface of said housing, said brace and frame having fixedly attached tabs, a brace retracting spring attached between said tabs, said brace having a catch lip locked with a forward surface of said bracket lower channel, said brace forward most end having a concave shape and protrudes from within said housing when said catch lip is locked, against tension of said spring, with said forward surface of bracket lower channel, said spring maintains said catch lip in a locked position;

(d) a pivotal lever secured between supports fixedly attached at a forward top surface of said brace, an upper leg of said lever having a contact rod attached thereto, a lower leg thereof having a surface resting upon said brace;

(e) a lug fastening a hitching ball upon a ball mount, means for said coupler being coupled with said hitching ball, said lug providing a support for said locked protruding brace forward most end, said forward most end having a concave shape abutting said lug supports said first assembly in a near horizontal position, said first assembly pivotal in a near horizontal plane;

(f) second assembly bifurcated bars, said bars having beveled forward most ends, said bars registrable with inner surfaces of said housing when received therein, said bars sandwich and are integral with blocks, said bars extending rearward, beyond said blocks, providing space between said bars to secure a cable guide pulley and a miniature winch, said blocks having apertures; and (g) a slide rod disposed through said apertures, said slide rod rear most end having a protruding stop, said stop abuts a rear surface of rear most block, said slide rod having a tapered forward most end slightly protruding beyond said forward most beveled ends of said bars, an end of a cable attached thereto, said cable extending and trained about said horizontal pulley and upon said vertical pulleys, grooved rims of said vertical pulleys slightly protrude from within rear end of said housing, said frame secured stop, being fastened upon a rear surface of said frame, having semicircle cable guide notches located at a bottom edge thereof, said notches maintaining said cable within upper grooved rims of said vertical pulleys, said cable returning through an aperture at said tapered forward most end of said slide rod, said cable extends through a channel of said slide rod, said channel extending to rear most end of said slide rod, said cable now extending to said winch, said frame secured stop, upon having said slide rod tapered forward most end abutting a forward surface thereof during winching, resulting in said slide rod being forced rearward as said bars are received within said housing, said first and second assemblies being united.

8. A separative trailer tongue as in claim 7, wherein said housing has apertures in it aligned with apertures in said bifurcated bars, and a pin removably receivable within said aligned apertures.

9. A separative trailer tongue as in claim 7, wherein a winch is located external of said trailer tongue, having said cable training about said cable guide pulley.

10. A separative trailer tongue as in claim 7, wherein forward edges of said bifurcated bars, said bars being received within said housing, push said contact rod, pivoting said lever, causing said surface resting upon said brace to push said brace causing said catch lip to unlock from said bracket lower channel forward surface, causing said brace to retract under spring tension resulting in said brace forward most concave end clearing said lug.

11. A separative trailer tongue as in claim 7, wherein a conventional pivotal jack wheel provides low friction conveyor means and height adjustments to facilitate necessary movements of said separative trailer tongue and an attached trailer during hitching operations.

12. A separative trailer tongue as in claim 7, wherein said bifurcated bars will fork internal components of said housing, except said contact rod, when said bifurcated bars are received within said housing.

13. A separative trailer tongue as in claim 7, wherein said first and second assemblies of said separative trailer tongue can be combined with a conventional trailer tongue.

14. A separative trailer tongue as in claim 7, wherein said brace has a stud at a forward lower surface thereof, said stud providing a grip for pulling upon said brace thereby locking said catch lip with said forward surface of said bracket lower channel.

15. A separative trailer tongue as in claim 11, wherein said lug is nut like and cylindrical shaped such that said brace forward most concave shaped end can surroundingly abut the same.

16. A separative trailer tongue comprising:
(a) a first assembly housing integral with a coupler and handle;
(b) means for having a frame within said housing supporting a horizontal pulley, vertical pulleys and a stop;
(c) means for having a bracket fastened within said housing and a brace sliding captured within said bracket;
(d) means for having a brace attached grip and means for gripping and pulling upon said brace;
(e) means for said brace to lock with said bracket against spring tension resulting in a protruding forward most end of said brace;
(f) means for supports securing a pivotal lever, said supports being attached upon said bracket, an upper leg of said lever having a contact rod, a lower leg having a surface resting upon said brace,
(g) a lug fastening a coupling component to said vehicle, said component having said coupler coupled thereto, said protruding forward most end of said brace abutting said lug, supporting said first assembly in a near horizontal position, said first assembly being pivotal in a near horizontal plane;
(h) second assembly bars having beveled forward most ends, said bars registrable with inner surfaces of said housing and forking components of said housing, except said contact rod, when received in said housing, said bars sandwich and are integral with blocks, said bars extending rearward beyond said blocks providing space between said bars to secure a winch and a cable guide pulley, said blocks having apertures;
(i) a rod slidingly disposed through said apertures, said rod rear most end having a stop abutting a rear surface of rear most block, said rod having a tapered forward most end, said tapered forward most end slightly protruding beyond said beveled forward most ends of said bars;
(j) means for having a cable end attached at said tapered forward most end of said rod, said cable extending training about said horizontal pulley and upon said vertical pulleys, said frame supported stop having semicircle notches maintaining said cable within grooved rims of said vertical pulleys, said rims slightly protruding from said housing, said cable returning through an aperture at said tapered forward most end of said rod and through a channel of said rod to said winch;
(k) winching said cable causing said tapered forward most end of said rod to abut said frame supported stop, said rod being forced rearward as said bars are received in said housing, forward edges of said bars pushing said contact rod pivoting said lever causing said surface upon said brace to push said brace unlocking said brace from said bracket, said brace forward most end retracting clearing said lug;
(l) apertures in said housing being aligned with apertures in said bars and a pin removably receivable within said aligned apertures; and
(m) means for having a low friction conveyor and height adjusting means fixedly attached to said tongue.

17. A separative trailer tongue as in claim 16, wherein said separative trailer tongue can be combined with a conventional trailer tongue.

18. A separative trailer tongue as in claim 16, wherein a winch is located external of said separative trailer tongue, having said cable trained about said cable guide pulley.

19. A separative trailer tongue as in claim 16, wherein a miniature winch is secured between said bars.

* * * * *